United States Patent [19]

Motoki

[11] 4,436,969

[45] Mar. 13, 1984

[54] TIMING DEVICE FOR TIME SWITCH

[75] Inventor: Yoshiaki Motoki, Hiroshima, Japan

[73] Assignee: Mitsubishi Denki Kabushiki Kaisha, Tokyo, Japan

[21] Appl. No.: 368,127

[22] Filed: Apr. 14, 1982

[30] Foreign Application Priority Data

Apr. 15, 1981 [JP] Japan .................................. 56-57393
Apr. 15, 1981 [JP] Japan .................................. 56-57394

[51] Int. Cl.$^3$ ...................... H01H 7/00; H01H 43/00; F16H 53/00

[52] U.S. Cl. ................................ 200/38 R; 74/568 T; 200/38 CA

[58] Field of Search .............. 200/38 R, 38 B, 38 BA, 200/38 C, 38 CA, 38 D, 38 DA; 74/568 R, 568 T, 568 M

[56] References Cited

U.S. PATENT DOCUMENTS

| | | | |
|---|---|---|---|
| 2,712,763 | 7/1955 | Horstmann | 74/568 T |
| 2,953,938 | 9/1960 | Bush | 74/568 T |
| 2,980,772 | 4/1961 | Doberstein | 200/38 CA |
| 3,275,376 | 9/1966 | Prox, Jr. | 74/568 R X |
| 4,295,015 | 10/1981 | Fujiwara et al. | 74/568 T X |
| 4,311,886 | 1/1982 | Rulseh | 200/38 BA X |

FOREIGN PATENT DOCUMENTS

| | | | |
|---|---|---|---|
| 55-50533 | 4/1980 | Japan . | |
| 55-71434 | 11/1980 | Japan . | |
| 56-16746 | 4/1981 | Japan . | |
| 254406 | 4/1948 | Switzerland | 200/38 CA |

*Primary Examiner*—J. R. Scott
*Attorney, Agent, or Firm*—Bernard, Rothwell & Brown

[57] ABSTRACT

In a timing device for time switch comprising a scale plate rotated at a constant rate and possessing presetting element plug-in portions involving slots, grooves and the like corresponding to time scale on the circumferential part thereof and presetting elements to be inserted to fit into the plug-in portions of the scale plate, this scale plate is composed of a molded plastic guide portion serving to position the presetting elements and to keep the position of each presetting element inserted in the prescribed position, and a metallic body inserted in the plastic guide portion in such a manner that a portion with which the presetting element resiliently engages comes to be a metallic portion.

7 Claims, 13 Drawing Figures

TIMING DEVICE FOR TIME SWITCH

BACKGROUND OF THE INVENTION

The present invention relates to a timing device for time switch.

Such type of a conventional timing device comprises a switch 1, an operating lever 2 for the switch 1, and time scale 3 disposed on the front surface of the timing device as shown in FIGS. 1-5. The timing device further comprises a scale plate 6 possessing plug-in portions 5 each consisting of a slot 51, a groove 52 and a frame 53 and for fitting a presetting element 4 thereinto, and such plug-in portions being arranged on the circumferential part of the scale plate so as to correspond to the respective time scales, presetting elements 4 each having ⊓-shape being capable of inserting the same to fit into the aforesaid plug-in portion 5, a clock mechanism 7 and the like parts.

In this arrangement, if a presetting element 4 has previously been fitted into the plug-in portion 5 at the position corresponding to a desired time scale on the scale plate 6, such scale plate 6 is rotated by means of the clock mechanism and when the prescribed time passed away, the lever 2 is shifted from a state illustrated by means of broken line to a state shown by solid line, in other words, the lever 2 is shifted in counterclockwise direction by means of the presetting element 4 inserted to turn the switch 1 ON. Further, when time elapsed and the presetting element 4 passed through the lever 2, the same is returned to the state illustrated by broken line to turn the switch OFF.

Referring to FIGS. 1 and 2 showing an example of a time switch in which the minimum presetting interval is fixed at 15 minutes, so that $(24\times60)/15=96$ plug-in portions are formed on the scale plate 6. Namely, this means that when one presetting element 4 is inserted in a plug-in portion, the switch 1 may be kept ON for only a period of time of 15 minutes from the time corresponding to the inserted position. Furthermore, when n presetting elements 4 are inserted in n plug-in portions in succession, the switch 1 can be kept ON state for a period of time of $n\times15$ minutes from the time corresponding to the initial inserted position of a presetting element 4.

Referring now to FIGS. 3 and 4 which show an example of a time switch in which the minimum presetting interval is fixed at 30 minutes, so that $(24\times60)/30=48$ plug-in portions 5 are formed on the scale plate 6. Thus, when one presetting element 4 is inserted in a plug-in portion, the switch 1 can be kept ON for only a period of time of 30 minutes from the time corresponding to the inserted position of the presetting element. In the case when n presetting elements 4 are fitted in n plug-in portions in succession, the switch 1 can be kept ON for a period of time of $n\times30$ minutes from the time corresponding to the initial fitted position of a presetting element 4.

In the above stated conventional time switches, both the scale plate 6 and presetting elements 4 shown in FIGS. 1 and 2 are made of a metal material, respectively, whilst both the scale plate 6 and presetting elements 4 shown in FIGS. 3 and 4 are made of a plastic material, respectively.

In the former time switch (FIGS. 1 and 2), even if a thickness of the presetting element 4 is thinned, a sufficient elastic force of the scale plate 6 as well as a strength required for the operation of the lever 2 can be obtained. Accordingly, the former time switch 1 has an advantage in that the minimum presetting interval can be fixed at a small value. On the other hand, however, since the plug-in portions 5 must be worked by means of press-cutting in this type of the time switch, a thickness T of the scale plate comes to be substantially equal to a width l of each slot 51 and groove 52. For this reason, the former time switch has a disadvantage in that an inserted presetting element 4 easily topples in the rotational direction of the scale plate 6 at the resiliently engaged portion as its fulcrum, so that it is difficult to keep the position of the element so inserted in the prescribed position. In addition, with decrease of a thickness of a presetting element 4, a thickness of a cutting blade in a press tool for cutting plug-in portions 5 of the scale plate 6 becomes also thin. Besides a number of such thin cutting blades are required for the fabrication of the former time switch 1, and as a result the greatest possible care is necessary for the press operation. Moreover, there is also such a disadvantage that considerable costs and man-power are required for maintaining manufacture properties of such press tool in respect of the former time switch 1.

As compared with the former time switch, the latter time switch (FIGS. 3 and 4) has advantages in that it is excellent in the mass productivity and can be inexpensively manufactured, besides it becomes easy to thicken a thickness of the scale plate 6, so that toppling of a presetting element 4 can be prevented to easily keep the position of the presetting element inserted in the prescribed position. However, in order to obtain a sufficient elastic force for the scale plate 6 and a strength required for operating the lever 2, a thickness of the presetting element 4 must be thickened, so that the minimum presetting interval increases. Thus, there is such a disadvantage that if the minimum presetting interval is identical to that of the former time switch, an external dimension of the scale plate 6 must be increased. In addition, the latter time switch has a disadvantage in that a dimension of the opening of a ⊓-shaped presetting element 4 expands and deforms by means of stress relaxation phenomenon of plastic material due to change in ambient temperature and the like phenomena thereby to lose the elastic force upon the scale plate 6, and as a consequence the presetting element 4 inserted falls off from the plug-in portion 5.

SUMMARY OF THE INVENTION

It is an object of the present invention to provide a timing device for time switch by which the above described disadvantages of conventional time switches can be eliminated, and the timing device for time switch according to the present invention can easily and inexpensively be manufactured, besides such compact timing device for time switch with a small minimum presetting interval can be fabricated without increasing a shape of the scale plate in accordance with the present invention.

PREFERRED EMBODIMENTS OF THIS INVENTION

Figure 3:
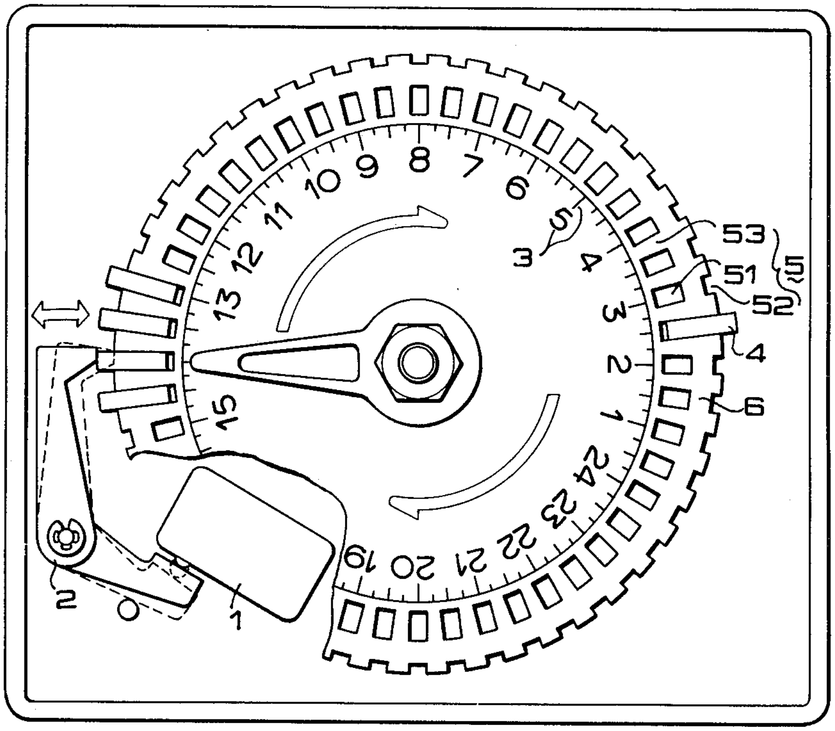
FIG.3 (PRIOR ART)
FIG. 3 is a front view showing another conventional timing device.
Figure 4:
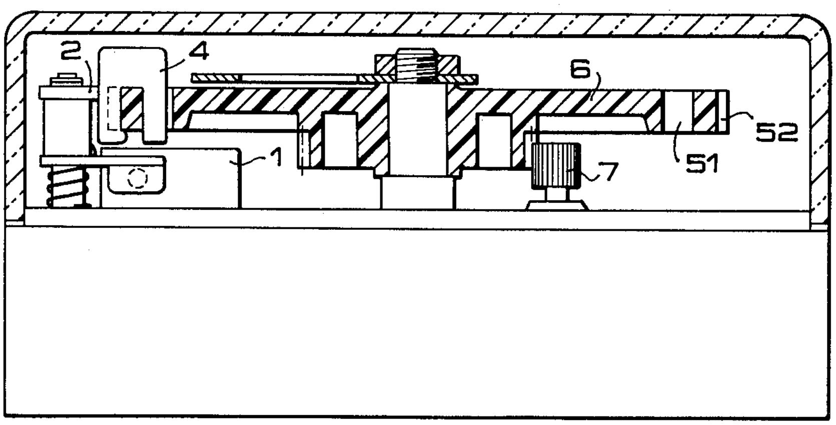
FIG.4 (PRIOR ART)
FIG. 4 is a side view showing the timing device of FIG. 3.
Figure 5:
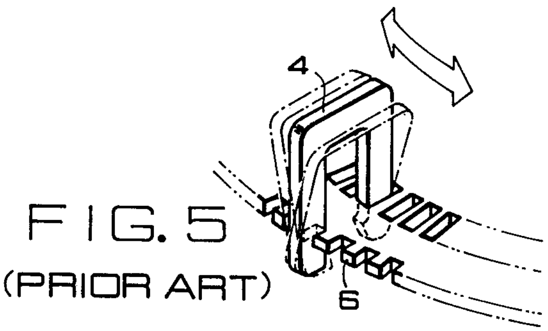
FIG. 5 (PRIOR ART)
FIG. 5 is an explanatory view showing an insertion state of a conventional presetting element.
Figure 6:
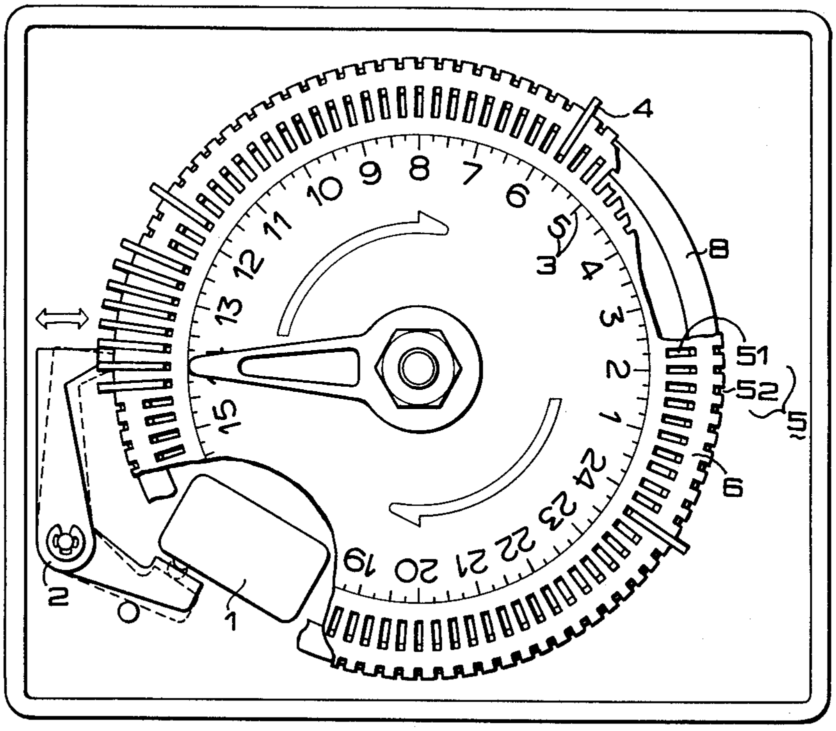
FIG. 6 is a front view showing a timing device for time switch in accordance with an embodiment of the present invention.
Figure 7:
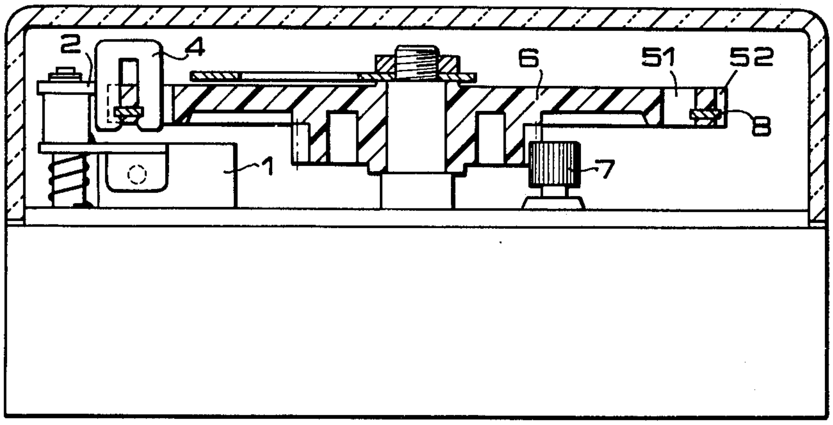
FIG. 7 is a side view showing the timing device of FIG. 6.

FIGS. 6 and 7 show a timing device according to one embodiment of the present invention in which a scale plate 6 is a plastics part similarly to a conventional one shown in FIGS. 3 and 4. However, the scale plate 6 of this invention differs from the conventional one in that a doughnut-like metallic disc 8 is in molded-in insert state with respect to the scale plate. Namely, the scale plate 6 is arranged in such that the inner circumference of the metallic disc 8 is exposed in slots 51, while the outer circumference of the metallic disc 8 is exposed in grooves 52, and a metallic presetting element 4 is resiliently engaged with the exposed portion thus formed.

Furthermore FIGS. 8–11 are sectional views each showing another embodiment of the timing device according to this invention.

Figure 8:
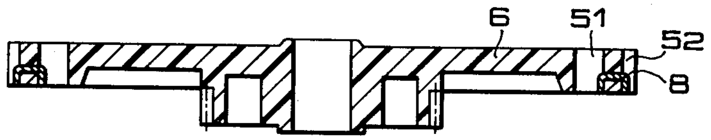
FIGS. 8–11 are sectional views each showing an essential part of another embodiment of the present invention.

More specifically, FIG. 8 shows a metallic disc 8 having a modified profile with ⊓-shaped in the vertical section thereof.

Figure 9:
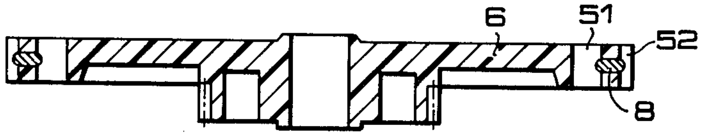

FIG. 9 illustrates a metallic disc 8 having a modified elliptical profile in the vertical section.

Figure 10:
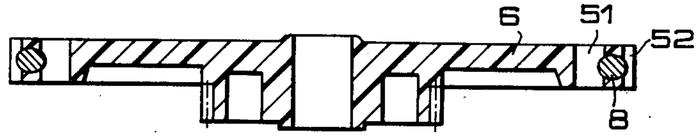

Further FIG. 10 shows a metallic disc 8 having a modified complete circular profile in the vertical section.

Figure 11:
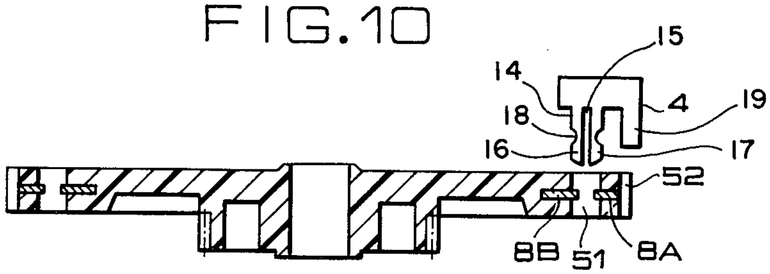

In addition, FIG. 11 shows an example in which two metallic discs, 8A and 8B are used. The two metallic discs 8A and 8B, comprising an outer annulus 8A and an inner concentric annulus 8B, both project into the slots 51 from opposite sides thereof. Because of the use of two metallic discs or rings arranged as shown, the presetting element 4A is shaped somewhat differently than the presetting element 4 shown in FIG. 7. Specifically, the presetting element 4A includes a split leg 14 having a slot 15 forming two leg portions 16, 17. The leg portions have notches 18 for engaging the rings 8A and 8B. In the embodiment shown in FIG. 11, the outer leg 19 of the presetting element 4A is flat, since the outer metallic ring does not project into the grooves 52 and need not be engaged by the leg 19.

Figure 12:
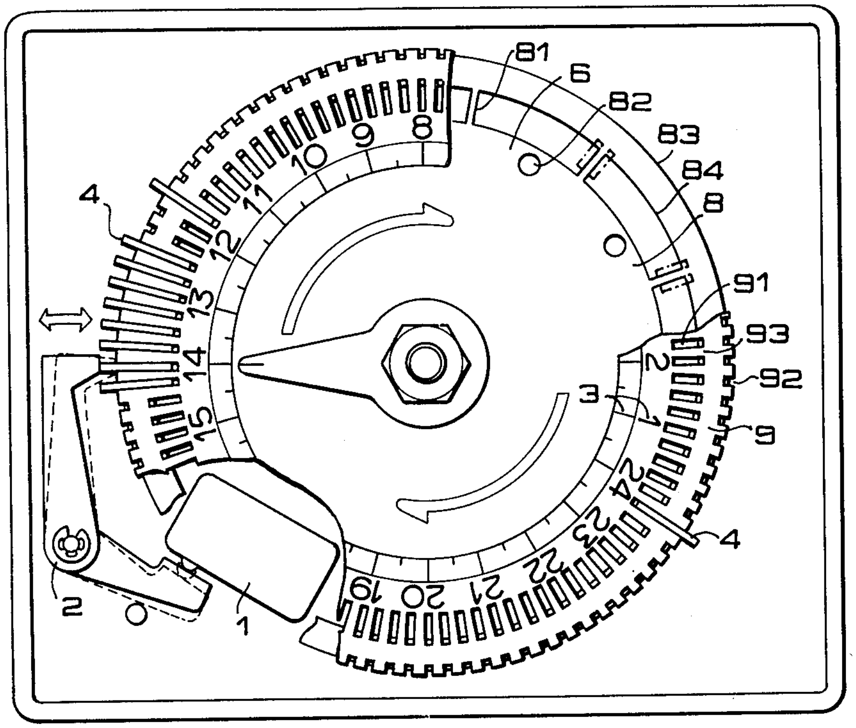
FIG. 12 is a front view showing a timing device in accordance with still another embodiment of the present invention.
Figure 13:
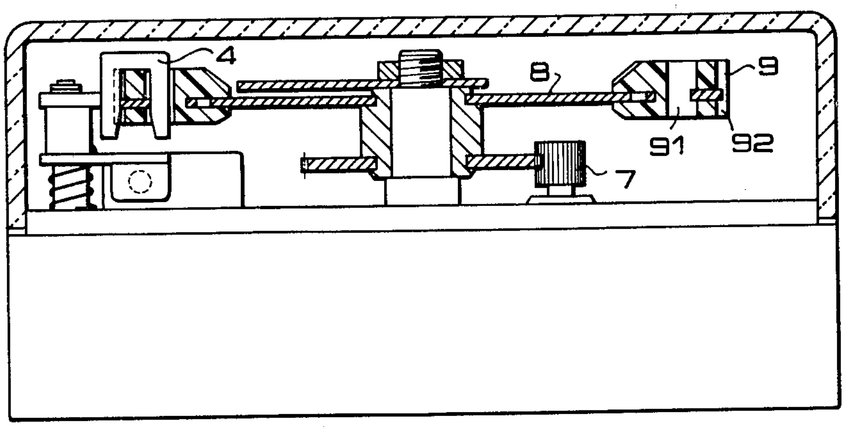
FIG. 13 is a side view showing the timing device of FIG. 12.

Next, FIGS. 12 and 13 illustrate still another embodiment of the timing device of the invention in which a scale plate 6 is composed of a metallic disc portion 8 and a plastic guide portion 9 integrally attached to the metallic disc 8 by means of outsert molding method upon the outer peripheral portion of the disc.

Figure 1:
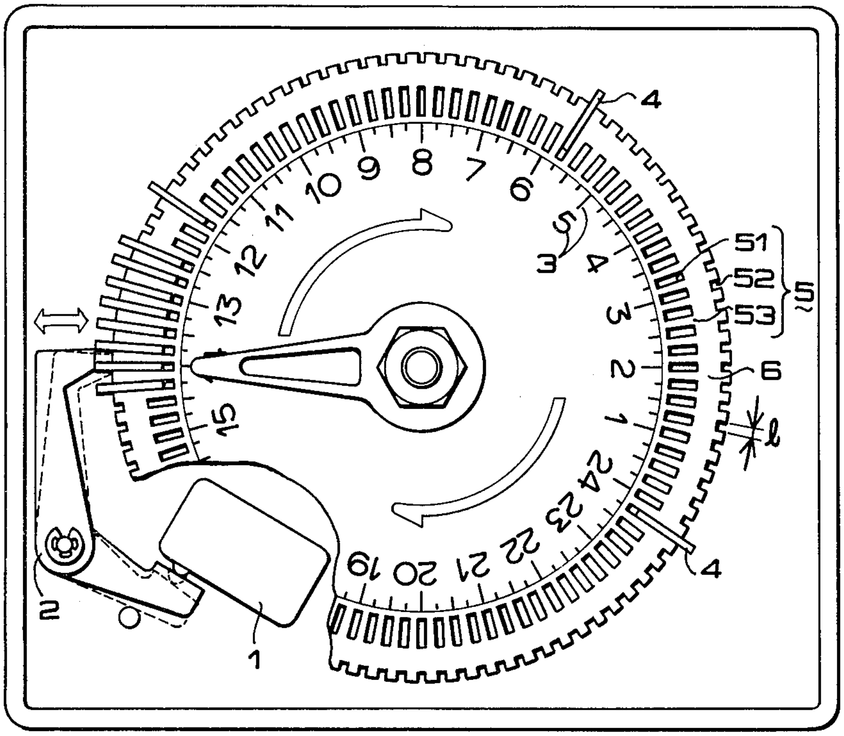
FIG.1 (PRIOR ART)
FIG. 1 is a front view showing a conventional timing device.
Figure 2:
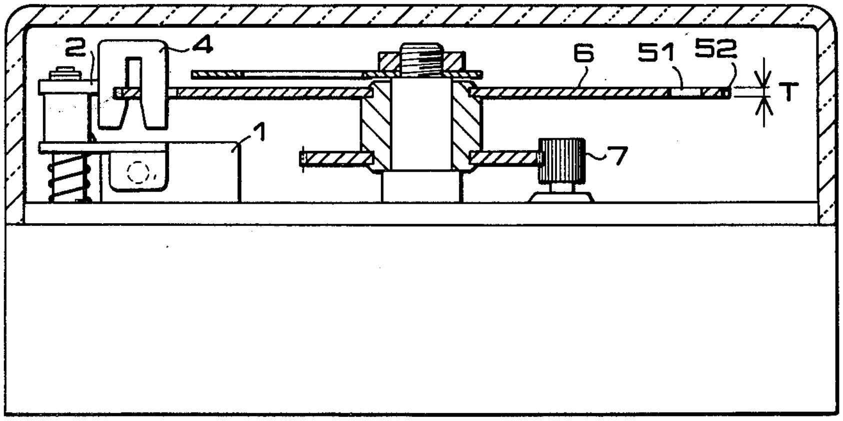
FIG.2 (PRIOR ART)
FIG. 2 is a side view showing the timing device of FIG. 1.

In the present embodiment, the metallic disc portion 8 has such a figure that a part of frames 53 (FIG. 1) of the conventional scale plate 6, for example, a part of ninety six frames 53 is omitted to leave only twelve frames 81 so as to keep regular intervals (30° each) and all the grooves 52 are cancelled. Namely, the metallic disc portion 8 is formed into a double ring shape having the outer and inner rings. Small holes 82 are formed on the metallic disc portion 8 to further increase binding power between the metallic disc portion and the guide portion 9. The guide portion 9 possesses slots 91 and grooves 92 corresponding to the slots 51 and the grooves 52, respectively, in the conventional scale plate 6. Further the guide portion 9 has such a depth for the presetting element 4 in the inserting direction which is sufficient for preventing toppling of the presetting element 4 in the circumferential direction of the scale plate. In addition, time scale 3 is provided on the surface of the guide position 9. Moreover the outermost periphery 83 of the aforesaid metallic disc portion 8 is exposed in the grooves 92, and the second outer periphery 84 is exposed in the slots 91 as shown in FIGS. 12 and 13. Besides the guide portion 9 is integrally molded together with the metallic disc portion 8 in accordance with outsert molding method in such manner that the frames 81 of the metallic disc portion 8 correspond to a frame 93 of the guide portion 9.

As described above, according to the present invention, the scale plate 6 is arranged in such a manner that the slots 51 and the grooves 52 thereof (slots 91 and grooves 92 in the embodiment of FIGS. 12–13) serve to position the presetting elements as well as to keep the position of an element inserted in the prescribed position, and a resiliently engaging portion of the presetting element 4 is composed of the metallic disc, so that the presetting element 4 may be fabricated from a thin metal plate. Thus, the timing device in accordance with the present invention has the following advantages as compared with a conventional timing device in which a plastic presetting element 4 is employed.

There is not such a case where the presetting element 4 is deformed by means of the influence of ambient temperature.

The presetting element has several times larger strength than that of a conventional one, so that the presetting element of this invention can easily operate even a switch 1 having a large switching capacity and being required for a large power for the operation thereof.

The presetting element 4 having a large elastic force can easily be obtained.

If the outer dimension of the presetting element 4 is made to be identical to that of the scale plate 6, the minimum preset interval can be reduced, while when the minimum preset interval of the timing device of this invention is identical to that of a conventional timing device, the compact scale plate 6 can be obtained in the present invention.

Besides the metallic disc 8 of the present invention has a simple doughnut shape and has not the slots 51 and grooves 52 as in the conventional metallic scale plate 6, and therefore the present invention has the advantages as described hereinbelow.

Since the shape of a press tool may be simple, the costs therefor becomes inexpensive, besides a life of the mold tool can remarkably be prolonged.

Since the shape of a product is simple, cycles for the press-cutting operation can be elevated, so that the improvement of mass productivity can be attained.

A density of the plug-in portions 5 to be provided on the scale plate 6 can be increased and consequently, a timing device with a small minimum preset interval can further compactly be fabricated.

Moreover, in accordance with the present invention, the timing device is arranged in such that the guide portion 9 being outsert-molded serves to position the locations of the presetting elements 4 to be inserted as well as to keep the position of an element inserted in the prescribed position, and the metallic disc portion 8 serves to resiliently engage with the presetting element 4 in order to prevent falling the element off. As a result, the timing device of the present invention has further the following advantages.

Unlike a conventional timing device, there is not such trouble that an operating time scatters due to toppling of a presetting element 4 mounted on the timing device in the circumferential direction of the scale plate 6 in the present invention.

The metallic disc portion 8 according to the present invention does not require a number of slots 51 and grooves 52 unlike the scale plate 6 in a conventional timing device, so that a construction of the press tool therefor becomes simple, whereby a solid, inexpensive and durable press tool may be utilized in the invention.

In the above embodiments, such a metallic disc 8 having a profile fabricated from a metallic plate by means of press-cutting was employed. In this respect, however, it is to be noted that manners such as press bending, press drawing, die casting, forging and the like may be utilized for fabricating the metallic disc 8 in the present invention.

What is claimed is:

1. A timing device for time switch comprising:

(a) a scale plate rotated at a constant rate and having plug-in portions involving slots and grooves corresponding to a time scale on the circumferential part thereof, (b) presetting elements to be inserted to fit into said plug-in portions of said scale plate, (c) an operating lever shifted by said presetting elements to turn a switch on, (d) said scale plate comprising a plastic guide portion to serve to position said presetting elements and to keep the position of each presetting element inserted in the prescribed position, and (e) a metallic body inserted in said plastic guide portion of said scale plate in such manner that the periphery of the metallic body extrudes into said slots and grooves, whereby said presetting elements resiliently engage the periphery of said metallic body.

2. The timing device for time switch as claimed in claim 1 wherein said metallic body is a metallic disc formed in a double ring shape having inner and outer rings, said guide portion is formed of synthetic resin on the double ring-shaped portion of said metallic disc, and the slots and grooves of said plug-in portions are disposed so as to expose the circumference of said double ring-shaped portion inside said slots and grooves.

3. The timing device as claimed in claim 1 wherein said metallic body has ⊓-shape in the vertical section thereof.

4. The timing device as claimed in claim 1 wherein said metallic body has an elliptical shape in the vertical section thereof.

5. The timing device as claimed in claim 1 wherein said metallic body has a circular shape in the vertical section thereof.

6. The timing device as claimed in claim 1 wherein said metallic body comprises a first annulus and a second concentric annulus, said first annulus extending radially outwardly into said slots, said second annulus extending radially inwardly into said slots and wherein each of said presetting elements includes a leg extending into a corresponding slot and resiliently engaging said first annulus and said second annulus.

7. The timing device as claimed in claim 1 wherein said metallic body comprises an annulus, the inner circumference of said annulus extends radially inwardly into said slots and the outer circumference of said annulus extends radially outwardly into said grooves, and each of said presetting elements is of inverted U-shape and includes a first leg extending into a corresponding slot and a second leg extending into a corresponding groove, said legs having notches therein for engaging the inner and outer circumferences of said annulus.

* * * * *